US010885102B1

(12) United States Patent
Arora et al.

(10) Patent No.: US 10,885,102 B1
(45) Date of Patent: Jan. 5, 2021

(54) MATCHING CHARACTER STRINGS WITH TRANSACTION DATA

(71) Applicant: American Express Travel Related Services Company, Inc., New York, NY (US)

(72) Inventors: Deepak Arora, Scottsdale, AZ (US); Donald R. Bloyer, Anthem, AZ (US); Peter Gosling, Tempe, AZ (US); Daniel Gruici, Glendale, AZ (US); Anish Jacob, Phoenix, AZ (US); Kyle Knez, Scottsdale, AZ (US); Christine Elizabeth Martin, Edison, NJ (US); Allison Mary Romano, New York, NY (US); Kedar P. Vaidya, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 16/810,334

(22) Filed: Mar. 5, 2020

Related U.S. Application Data

(63) Continuation of application No. 16/159,255, filed on Oct. 12, 2018, now Pat. No. 10,592,549, which is a continuation of application No. 15/701,027, filed on Sep. 11, 2017, now Pat. No. 10,127,247.

(51) Int. Cl.
*G06K 5/00* (2006.01)
*G06F 16/583* (2019.01)
*G06Q 20/32* (2012.01)
*G06T 1/00* (2006.01)
*G06T 1/20* (2006.01)
*G06Q 20/20* (2012.01)
*G06Q 20/04* (2012.01)

(52) U.S. Cl.
CPC ......... *G06F 16/583* (2019.01); *G06Q 20/047* (2020.05); *G06Q 20/209* (2013.01); *G06Q 20/3276* (2013.01); *G06T 1/0007* (2013.01); *G06T 1/20* (2013.01)

(58) Field of Classification Search
CPC . G06F 16/583; G06Q 20/047; G06Q 20/3276
USPC ....................................................... 235/380
See application file for complete search history.

(56) References Cited

U.S. PATENT DOCUMENTS

| | | | |
|---|---|---|---|
| 7,873,200 B1 | 1/2011 | Oakes, III et al. | |
| 9,865,012 B2 | 1/2018 | Vidal et al. | |
| 10,540,646 B2 * | 1/2020 | Schlosser | G06Q 50/12 |
| 2012/0078682 A1 | 3/2012 | Pinsley et al. | |
| 2012/0330971 A1 | 12/2012 | Thomas et al. | |
| 2013/0129218 A1 | 5/2013 | Barrett et al. | |
| 2013/0201307 A1 | 8/2013 | Schloter et al. | |
| 2014/0105510 A1 | 4/2014 | Chelst et al. | |

(Continued)

*Primary Examiner* — Ahshik Kim
(74) *Attorney, Agent, or Firm* — Thomas Horstemeyer, LLP

(57) ABSTRACT

A user may capture an image of a document using a mobile device. The mobile device may crop and clean the image. The mobile device may perform optical character recognition on the image and output a character string. The mobile device may match portions of the character string with stored records and determine a likelihood that the stored record corresponds to the image. The mobile device may display potential matches for the image, and the user may select the record which matches the image.

20 Claims, 5 Drawing Sheets

(56) References Cited

U.S. PATENT DOCUMENTS

| | | | |
|---|---|---|---|
| 2014/0164234 A1* | 6/2014 | Coffman | G06Q 20/102 705/40 |
| 2015/0149312 A1 | 5/2015 | Cancro et al. | |
| 2016/0055568 A1* | 2/2016 | Vidal | G06Q 30/00 705/26.7 |
| 2016/0203456 A1* | 7/2016 | Herring | G06Q 20/047 705/24 |
| 2017/0255793 A1 | 9/2017 | Caldwell | |
| 2018/0189786 A1 | 7/2018 | Poole | |

* cited by examiner

MATCHING CHARACTER STRINGS WITH TRANSACTION DATA

CROSS REFERENCE TO RELATED APPLICATIONS

This application is a continuation of, and claims priority to and the benefit of, U.S. patent application Ser. No. 16/159,255, filed on Oct. 12, 2018 and entitled "MATCHING CHARACTER STRINGS WITH TRANSACTION DATA." The '255 application is a continuation of, claims priority to and the benefit of, U.S. patent application Ser. No. 15/701,027, filed Sep. 11, 2017 and entitled "LINKING DIGITAL IMAGES WITH RELATED RECORDS." All of these applications are hereby incorporated by reference in their entireties.

FIELD

The disclosure generally relates to linking images of receipts with associated data.

BACKGROUND

Credit cards, charge cards, and other transaction instruments may be commonly accepted today as a form of payment to a merchant, under a variety of circumstances.

The transaction instrument may be used to complete a purchase in-person (e.g., at a retail store, a restaurant, a hotel, etc.), or may also be used to complete a purchase by relaying information associated with the transaction instrument (e.g., account number, account name, expiration data, billing address, etc.) to a merchant remotely, such as, for example, through the internet, by telephone, or by mail order. Transaction account owners may desire to view electronic receipt data, and other such enriched transaction data, related to each purchase. For example, a transaction account owner may desire to view electronic receipt data for individual purchases for convenience (e.g., effective expense management, reminders, simplified book keeping, etc.), to detect fraud, to dispute a purchase, and/or the like.

Transaction account owners may view transaction account statements (e.g., in an electronic and/or reoccurring statement) to review authorized (e.g., pending) charges and/or posted (e.g., settled) transactions. Typically, a transaction account owner receives a receipt, and other such enriched transaction data, as a written or electronic acknowledgment that a specified payment was received from one or more parties (e.g., from the merchant, a third party aggregator, a transaction account processing company, etc.). However, typical systems are cumbersome for transaction account owners to match the receipt to a transaction in the transaction account statement. Additionally, typical receipt matching systems utilize significant processing power of transaction account issuer systems, as well as require many transmissions back and forth between transaction account owner devices and the transaction account issuer systems, which can both increase processing loads and delay the process by milliseconds for each transmission.

SUMMARY

Systems, methods, and articles of manufacture (collectively, the "system") for matching images to related records are disclosed. The system may capture an image of a receipt; perform optical character recognition on the image; create, based on the optical character recognition, a character string; retrieve a plurality of transactions; match the character string with transaction data for the plurality of transactions; display a list of possible transactions from the plurality of transactions which match the character string above a threshold level; receive a selection of a matching transaction from the list of possible transactions; and transmit the image to an issuer system.

In various embodiments, the system may crop the image. The system may convert the image to black and white. The system may convert the character string to an array of string elements. The system may consist of a mobile phone. The threshold level may represent a percentage likelihood of a match to the image. The transaction data may comprise a transaction date and a transaction amount.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
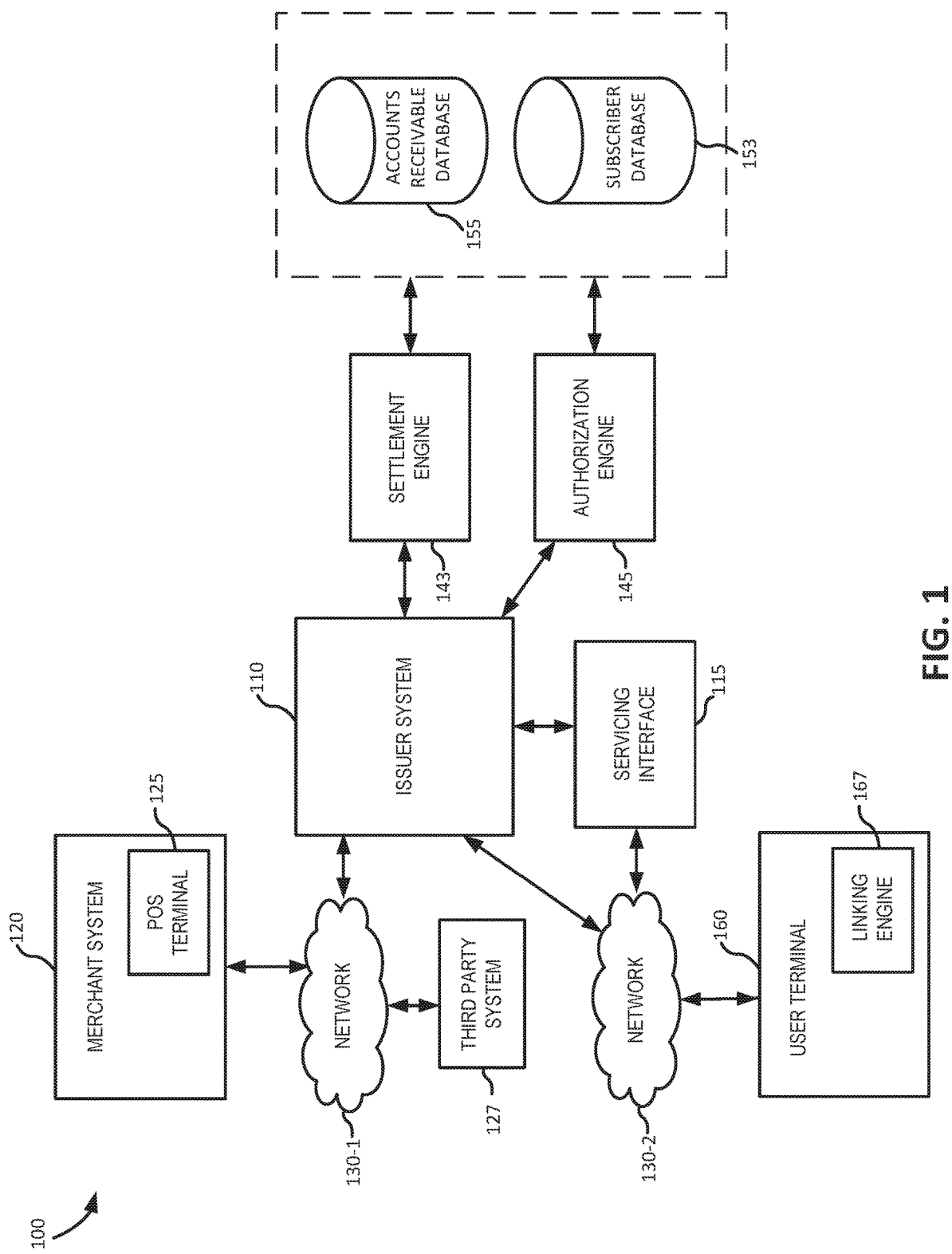
FIG. 1 illustrates a block diagram illustrating various system components of a system for linking images with related data, in accordance with various embodiments.

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, transaction account authorizations may be performed at the transaction account issuer's credit authorization system ("CAS") in response to a swipe and/or submission of transaction instrument data by the transaction account holder at a Point of Sale ("PoS") system and/or merchant. The CAS may issue an approval code as a proof of authorization. After the transaction authorization is complete, the merchant and/or PoS may typically provide a physical receipt, email receipt and/or the like, containing transaction data.

In general, a transaction account holder may capture an image of the receipt using a mobile device, such as a smartphone. The mobile device may perform optical character recognition ("OCR") on the image to extract a character string of the information printed on the receipt. The mobile device may retrieve recent transactions from the CAS. The mobile device may retrieve recent transactions from then environment where pending charges and posted charges are aggregated together. The mobile device may retrieve the recent transaction from the environment using one or more APIs. The mobile device may match portions of the character string to data fields for the transactions. The mobile device may calculate a likelihood that transactions correspond to the receipt. The mobile device may present the most likely transactions to the transaction account owner, and the transaction account owner may select the transaction for the receipt. The mobile device may transmit the receipt image to the CAS, and the CAS may store the receipt image as a document for the ROC for the transaction.

The systems and methods provided herein may enable linkage of electronic receipts to a transaction authorization completed via any acquirer or processor. In this regard, more information is available at the transaction level, which may help to provide increased financial clarity to the transaction account holder. This may also result in easier accounting, book keeping, expense reporting, reduced disputes and/or chargebacks, merchant returns, and/or the like. Warranty documents, return policies, and tracking of services may also be accommodated by the system and methods described herein.

In various embodiments, enhanced satisfaction may be experienced by transaction account holders. For example, digital connection access may be provided to transaction account holders almost immediately (or at any time) after a transaction, which can be used for providing continuous support and services. The systems and methods described herein may also provide for a reduction in disputes and a reduction in fraud, as a digital copy of documents, receipts, and/or other transaction data may be available in real time or soon after the time of the transaction.

The systems and methods provided herein may reduce storage requirements on the mobile device, because the receipt images and metadata may be stored in back end databases and cloud storage systems. Additionally, the processing requirements on the mobile device may be reduced by automatically matching the receipt image without requiring the user to scroll through all transactions.

More particularly, and referring to FIG. 1, a system 100 for linking images with related records is disclosed. In various embodiments, the system 100 may be computer based, and may comprise a processor, a tangible non-transitory computer-readable memory, and/or a network interface, along with other suitable system software and hardware components. Instructions stored on the tangible non-transitory memory may allow the system 100 to perform various functions, as described herein. The system 100 may also contemplate uses in association with web services, utility computing, pervasive, and individualized computing, security and identity solutions, autonomic computing, cloud computing, commodity computing, mobility and wireless solutions, open source, biometrics, grid computing and/or mesh computing.

In various embodiments, the system 100 may comprise an issuer system 110. The issuer system 110 may be configured as a central hub to access various systems, engines, and components of the system 100. In that regard, the issuer system 110 may comprise a network, computer-based system, and/or software component configured to provide an access point to various systems, engines, and components. The issuer system 110 may be in operative and/or electronic communication with various system 100 networks (e.g., network 130-1 and network 130-2), a settlement engine 143, and/or an authorization engine 145. In various embodiments, the issuer system 110 may also comprise a transaction account issuer's Credit Authorization System ("CAS") capable of authorizing transaction account purchase requests, as discussed further herein.

In various embodiments, the system 100 may comprise a merchant system 120. The merchant system 120 may incorporate hardware and/or software components. The merchant system 120 may be configured to enable a merchant to receive a payment from a user, and submit a request to authorize the payment. The merchant system 120 may comprise a POS terminal 125 configured as a mechanism to conduct a transaction. In this regard, the POS terminal 125 may enable a user to initiate a transaction with a merchant. For example, the POS terminal 125 may comprise a cashier station, a credit or debit card reader, and/or the like. The POS terminal 125 may also comprise a near-field communication (NFC) terminal. In this regard, an NFC terminal may allow for the transfer of information to another NFC enabling device, such as a mobile device. In various embodiments, the POS terminal 125 may allow a user to pay a merchant using a virtual token stored on an NFC enabled mobile device.

In various embodiments, the merchant system 120 and the issuer system 110 may be interconnected via the network 130-1 (e.g., a payment network). The network 130-1, which may be part of certain transactions, represents existing networks that presently accommodate transactions for credit cards, debit cards, and/or other types of transactional instruments. The network 130-1 may be a closed network that is secure from eavesdroppers. In various embodiments, the network 130-1 may comprise an exemplary transaction network such as American Express®, VisaNet®, Veriphone®, Discover Card®, PayPal®, ApplePay®, GooglePay®, private networks (e.g., department store networks), and/or any other payment networks.

As used herein, the term "network" may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers.

Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

In response to a user initiating a transaction with the merchant system 120 through the POS terminal 125, the merchant system 120 may send a transaction authorization request to the authorization engine 145 via issuer system 110. The transaction authorization request may comprise transaction identification information, which may be standardized codes or numbers indicating the characteristics of the transaction (e.g., a merchant category code, a service establishment number, geographic location code, product code, POS terminal number, and/or the like), a transaction request amount, and/or a user profile identifier such as a transaction account number, a user account, a user account number, a card security code (CSC) or a card verification value (CVV), and/or any other identifying information.

In various embodiments, the authorization engine 145 may be configured to authorize the transaction authorization request received from the merchant system 120. In that respect, the authorization engine 145 may be in electronic and/or operative communication with a subscriber database 153. The subscriber database 153 may store and maintain data regarding transaction accounts, such as, for example, a transaction account number, user account access data (e.g., username, password, and/or the like), transaction account identifying information (e.g., owner address, city, state, zip code, etc.), a card security code (CSC) or a card verification value (CVV), transaction account balance, and/or other such similar data. The subscriber database 153 may store the data using any suitable technique described herein or known in the art. The authorization engine 145 may validate the risk of the transaction authorization request, such as, for example, by comparing the transaction authorization request to the stored transaction account data in the subscriber database 153 (e.g., compare the transaction request amount to the transaction account balance, the CSV/CVV codes, owner identifying information, etc.). In response to approving the transaction authorization request, the authorization engine 145 may transmit an authorization code, via the issuer system 110, to the merchant system 120. The merchant system 120 may store the authorization code as proof of the transaction and may issue a receipt to the transaction account owner as a written or electronic acknowledgment that a transaction payment was received.

In various embodiments, in response to authorizing the transaction authorization request, the authorization engine 145 may communicate with an accounts receivable database 155 to store and maintain data on the authorized transactions. In that regard, the accounts receivable database 155 may store the data as a pending transaction corresponding to the transaction account. The accounts receivable database 155 may store the data using any suitable technique described herein or known in the art. According to various embodiments, a pending transaction is an authorization that has taken place (e.g., the transaction is approved, and/or the goods have been exchanged for value), where the merchant (and/or a merchant aggregator) may decide to post the transaction for reimbursement (e.g., a posted transaction). For instance, there are many cases where the transaction may not be posted by the merchant. For example, hotel room reservations may often record a transaction account for the purpose of guaranty of available payment. Typically, at the end of the day (or at any other suitable time interval), a merchant, for the purpose of being reimbursed, will submit pending charges to an issuing bank and/or transaction account processor to convert the pending charge to a posted transaction (e.g., via the settlement engine 143, as discussed further below). In this way, the pending change is converted (settled) to a posted transaction.

In various embodiments, the authorization engine 145 may also be configured to transmit a transaction authorization alert in response to authorizing the transaction authorization request. The authorization engine 145 may transmit the transaction authorization alert, via the issuer system 110, to a user terminal 160. In that respect, the authorization engine 145 may transmit the transaction authorization alert via email, SMS, MMS, smartphone notification, Facebook® Messenger, and/or the like. The transaction authorization alert may comprise data corresponding to the authorized transaction, such as, for example, the transaction request amount, merchant identifying information, and/or the like. A transaction account owner may view the transaction authorization alert via the user terminal 160.

In various embodiments, the system 100 may comprise a settlement engine 143. In various embodiments, the settlement engine 143 may be configured to process transaction information, convert pending charges into posted transactions, and settle posted transactions against a transaction account. The settlement engine 143 may process payment information by communicating with the accounts receivable database 155 to recall data on authorized transactions for a transaction account. The settlement engine 143 may also, in response to a successful payment transaction, send a transaction confirmation to the merchant system 120, via issuer system 110, notifying a merchant of a successful payment transaction.

In various embodiments, the user terminal 160 may comprise a data linkage engine 167. In various embodiments, the data linkage engine 167 may be implemented as an application on the user terminal 160. The data linkage engine 167 may retrieve recent transactions from the issuer system 110. The transaction account owner may capture an image of a physical or digital receipt for a transaction. The data linkage engine 167 may be configured to match the receipt image to a record of charge. The data linkage engine 167 may match the receipt image based on any suitable factor. For example, the data linkage engine 167 may match the receipt image based on transaction attributes, such as transaction amount, transaction date, transaction time, merchant ID, merchant name, authorization code, authorization timestamp, and/or through any other suitable factor. In various embodiments, the data linkage engine 167 may search for an exact match, or may search for a partial match. For example, the data linkage engine 167 may search for an exact match of merchant ID, merchant name, authorization code, and/or similar factors, but may allow for some tolerance for transaction date (e.g., may be within one or two days), transaction amount, authorization timestamp, and/or the like. In various embodiments, the data linkage engine 167 may also match the receipt image based on a unique transaction identifier and/or the like. Each field with an exact match may increase the likelihood that the record of charge matches the receipt image. With each additional field exact match, the percentage of correctness between the image data and the transaction data is increased, indicating a greater match likelihood between the receipt image and the record of charge. Each field that is not an exact match but is within a tolerance range may increase the likelihood by a lesser amount. The tolerance may be defined based on a percentage of similarity using a pattern matching algorithm. For example, a field that is greater than 80% similar between the record of charge and the receipt image may be classified as a non-exact match.

The data linkage engine 167 may select one or more transactions which may potentially match the receipt image. For example, the data linkage engine 167 may determine that there are four transactions with a likelihood of greater than 20% that match the receipt image. The match percentage may be determined based on the matching algorithm that compares the records of charge with the receipt image. The data linkage engine 167 may display the transactions on the user terminal 160 which have a match likelihood above a threshold value. The transaction account owner may review the transactions and select the transaction which matches the receipt. In response to a record of charge being matched with the receipt image, the data linkage engine 167 may transmit the receipt image to the issuer system 110. In response to not locating an associated record of charge, the data linkage engine 167 may lower the threshold value, or the data linkage engine 167 may inform the transaction account owner that no match is available.

The user terminal 160 may be in operative and/or electronic communication with the issuer system 110, and may be configured to interface with the issuer system 110.

The user terminal 160 may comprise any suitable hardware and/or software components capable of sending and receiving data. For example, the user terminal 160 may comprise a personal computer, personal digital assistant, cellular phone, kiosk, and/or the like. The user terminal 160 may also comprise a near-field communication (NFC) enabled device, such as a smartphone (e.g., IPHONE®, BLACKBERRY®, and/or the like), a smart-ring, and/or the like.

In various embodiments, the user terminal 160 may be configured to allow a user access to transaction account information in the issuer system 110. The issuer system 110 may comprise a servicing interface 115. The servicing interface 115 may comprise a website, application, and/or the like capable of allowing a user, via the user terminal 160, access to issuer system 110. The servicing interface 115 may require a secure login (e.g., a username and password) in order to grant a user access to issuer system 110. For example, a transaction account owner may access issuer system 110, via servicing interface 115, by entering their secure login information to electronically view their corresponding transaction account, including transaction reports, records of charge, and/or the like.

In various embodiments, a transaction account owner may select an individual record of charge and select an option to view receipt data related to that record of charge. The receipt data may populate (e.g., as populated fields, as a virtual representation of the physical receipt, and/or the like), allowing the transaction account owner to view the receipt data related to the record of charge. The transaction account owner may view, download, and/or print the receipt data linked to each corresponding record of charge. For example, the transaction account owner may print the receipt data as a proof of the transaction, allowing the transaction account owner to submit the printed receipt data to a merchant for a refund, exchange, store credit, warranty purposes, and/or the like. In various embodiments, the issuer system 110, via the servicing interface 115, may also enable the transaction account owner to print the enriched transaction data in a secured and/or verified manner. In that respect, the enriched transaction data may print to comprise a verified marking, such as a watermark and/or the like, to aid against fraud and/or similar such acts.

Figure 2:
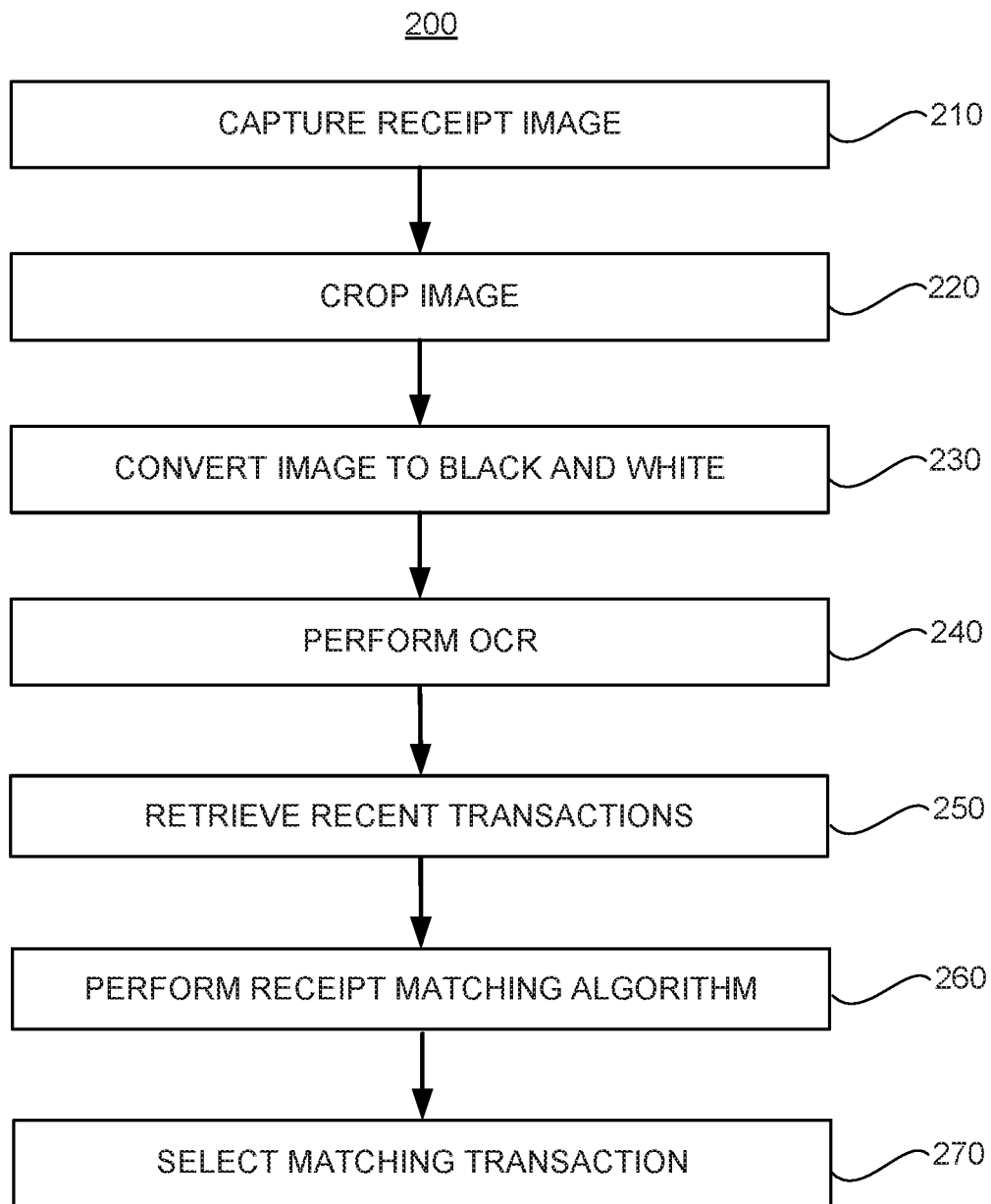
FIG. 2 illustrates a process flow for linking images with related data, in accordance with various embodiments.

Referring to FIG. 2, a method 200 for linking a receipt image to a record of charge is disclosed. In various embodiments, the method 200 may comprise capturing a receipt image (step 210). The user terminal may comprise a camera, and the transaction account owner may use the camera of the user terminal to capture a digital image of a paper receipt. The user terminal may crop the receipt image (step 220). In various embodiments, the user terminal may delete the pixels other than of the receipt. In various embodiments, the user terminal may crop the receipt image to the smallest possible rectangle which includes the receipt. By decreasing the image size, the user terminal may decrease the file size which will be subsequently stored, as well as remove extraneous information and decrease the processing requirements for further image processing.

The user terminal may convert the receipt image to black and white (step 230). Converting the receipt image to black and white may decrease file size and increase accuracy of further processing steps, such as OCR. The user terminal may perform OCR on the receipt image (step 240). The OCR process may output a character string of all characters printed on the receipt. In various embodiments, the user terminal may convert the character string to an array of string elements, such as by separating elements wherever one or more spaces or line breaks occur between characters. The user terminal may retrieve recent transactions from the card authorization system (step 250). The card authorization system may be programmed to retrieve recent transactions based on a length of time, such as all transactions within the last five days. In various embodiments, the card authorization system may be programmed to retrieve recent transactions based on a fixed number of transactions, such as the most recent twenty transactions. In various embodiments, the transactions may be retrieved in response to the user capturing a receipt image, in response to the user opening an application on the user terminal, or the card authorization system may transmit individual transactions to the user terminal as they occur. Thus, the user terminal may retrieve the recent transactions before, during, or after the receipt image is captured. The user terminal may access the card authorization system and account receivable transaction data through a staging database and/or APIs.

The user terminal may perform a receipt matching algorithm (step 260). The user terminal may determine, based on a matching algorithm and/or character string comparison, the likelihood that each recent transaction matches the data in the character string. In various embodiments, the likelihood of match may be expressed as a percentage, decimal, or other value. The user terminal may match the receipt based on transaction attributes, such as transaction date, transaction amount, merchant ID, merchant name, authorization code, authorization timestamp, and/or through any other suitable factor. In various embodiments, the user terminal may locate an exact match or a partial match. The user terminal may display a list of the transactions with the highest likelihood of match. The highest likelihood transactions may be determined based on the transactions which have the highest matching pattern above a threshold likelihood of match. In various embodiments, the user terminal may display a fixed number of transactions, such as the three most likely transactions. In various embodiments, the user terminal may display all transactions above a threshold likelihood of match, such as all transactions which are at least 10% likely to be a match with the receipt image.

The transaction account owner may select the transaction which matches the receipt, such as by tapping on the transaction in the list (step 270). In response to a record of charge being matched with the receipt image, the user terminal may transmit the receipt image to the credit authorization system to link the receipt image to the corresponding record of charge. The matched information may be stored in a linking database, and the receipt image may be linked to the corresponding record of charge using a reference ID. In that respect, a transaction account owner may later request to view, download, print, and/or the like the receipt image linked to the corresponding record of charge, such as, for example, through viewing the record of charge on an online servicing system (as described in more detail herein). The issuer system may return the receipt image to the transaction account owner, via any user terminal, in response to the transaction account owner requesting the receipt image (e.g., accessing the record of charge and viewing, downloading, printing, and/or the like the receipt image).

Figure 3:
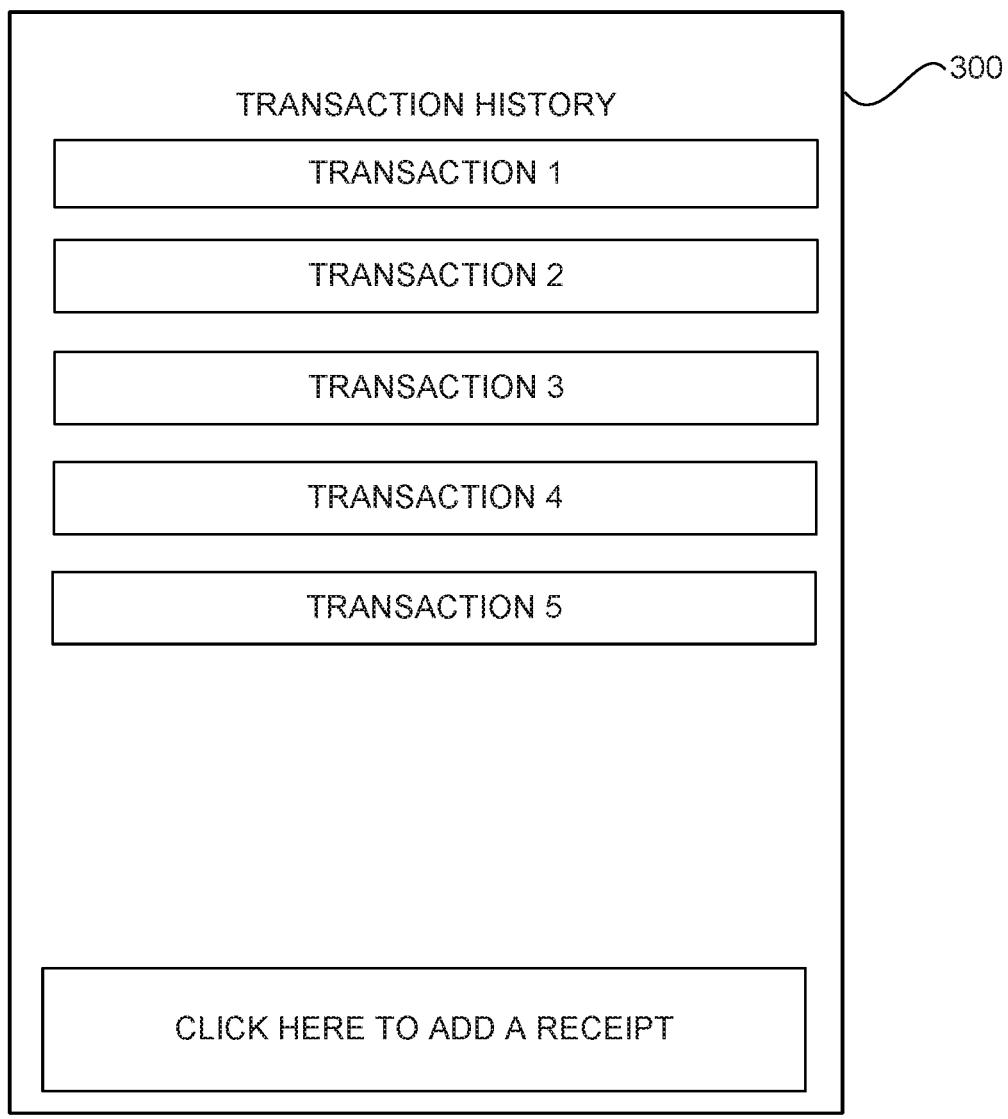
FIG. 3 illustrates a screenshot of a GUI for image linkage, in accordance with various embodiments.

Referring to FIG. 3, a GUI 300 for image linkage is illustrated according to various embodiments. In various embodiments, a user may access a transaction account application on a user terminal to link a receipt with a record of charged as described with reference to FIG. 1 and FIG. 2. The user may select a button to begin the image linking process. The GUI 300 may prompt the user to capture a photograph.

Figure 4:
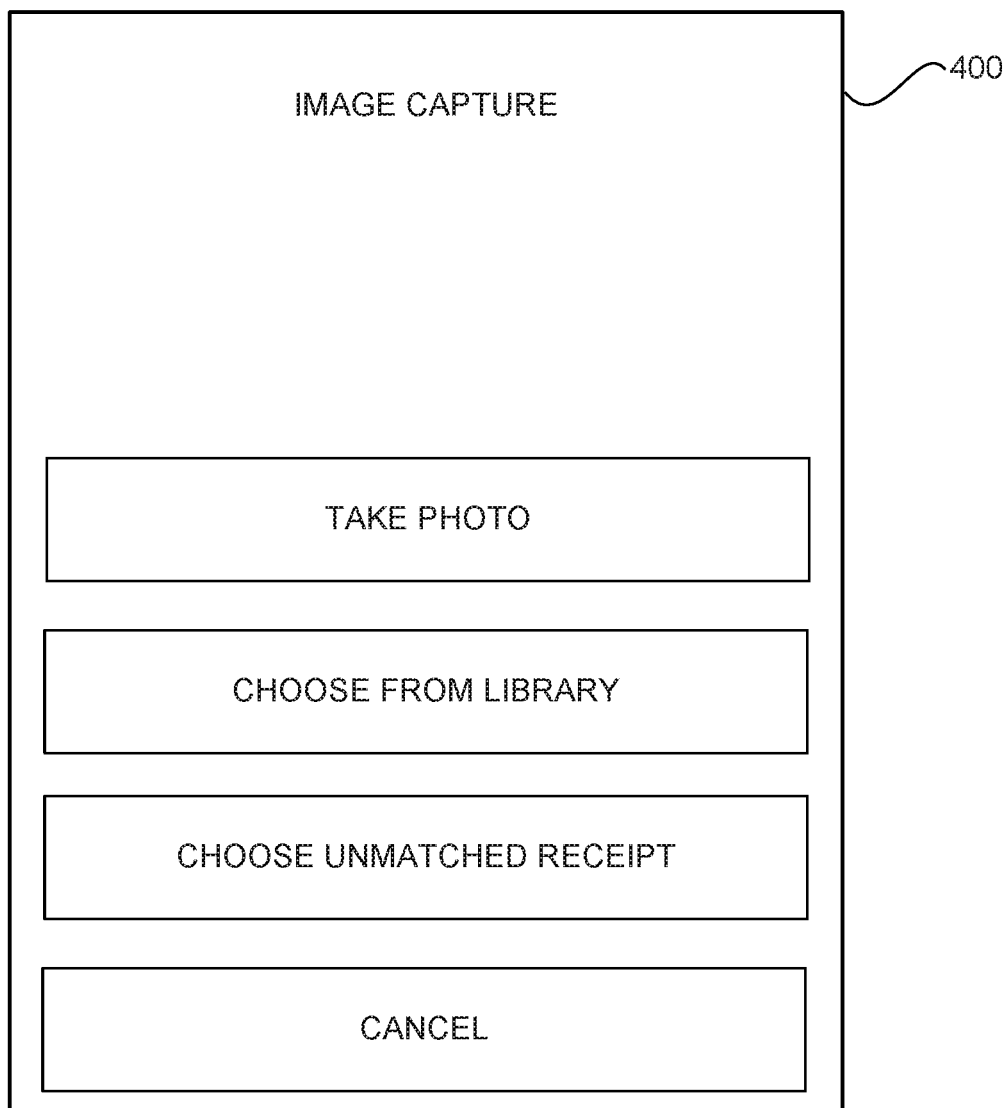
FIG. 4 illustrates a screenshot of a GUI for capturing an image, in accordance with various embodiments.

Referring to FIG. 4, a GUI 400 for capturing a photograph is illustrated according to various embodiments. The GUI 400 may include various options for the user to capture the image. For example, the user may select to use a previously captured image stored on the user terminal, or the user may select to take a new photograph.

Figure 5:
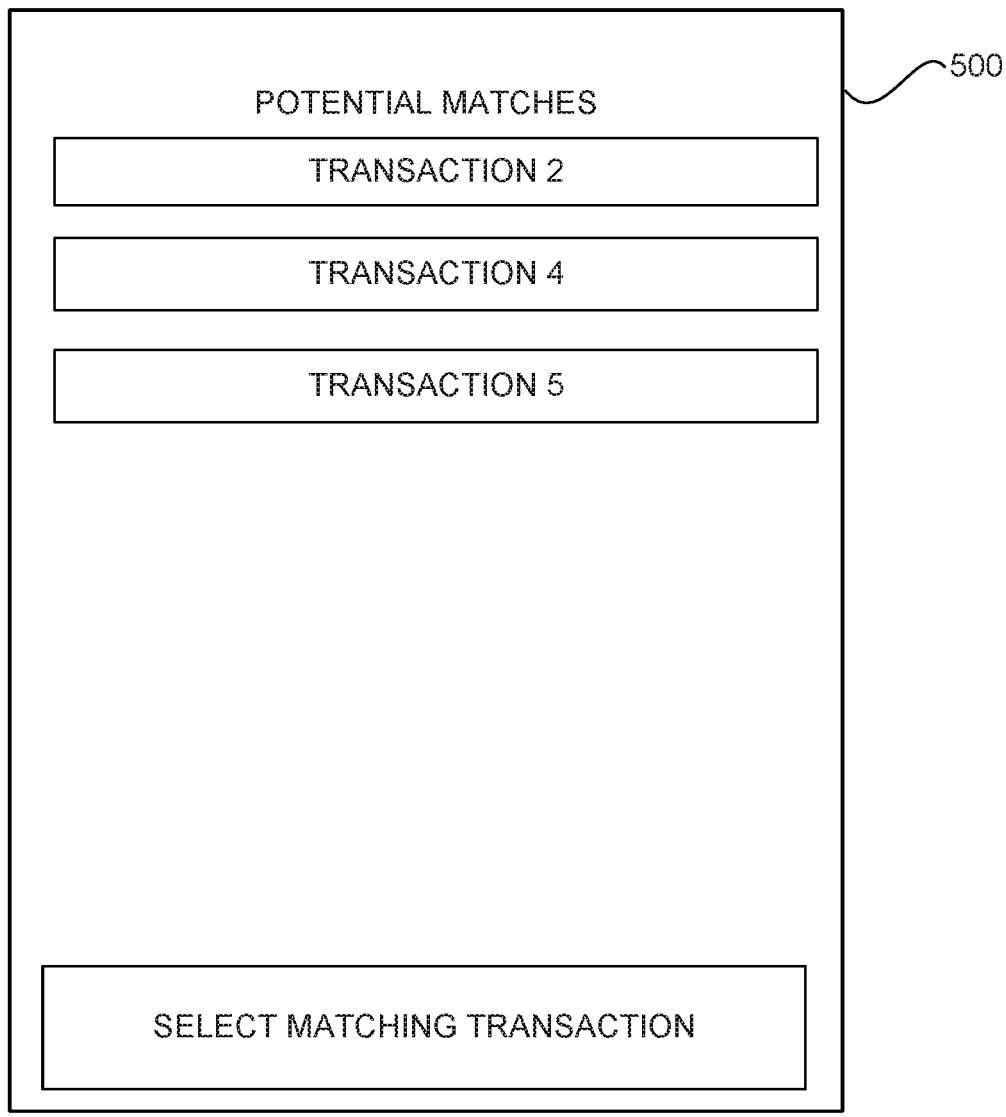
FIG. 5 illustrates a screenshot of a GUI for selecting a matching record, in accordance with various embodiments.

Referring to FIG. 5, a GUI 500 for selecting a matching record of charge is illustrated according to various embodiments. The GUI 500 may display a list of the transactions most likely to match the receipt. The transaction account owner may review the list of transactions and select the transaction which matches the receipt. The issuer system may then store the receipt image with the record of charge for the transaction.

The disclosure and claims do not describe only a particular outcome of linking an enriched transaction data to a record of charge, but the disclosure and claims include specific rules for implementing the outcome of linking an enriched transaction data to a record of charge and that render information into a specific format that is then used and applied to create the desired results of linking an enriched transaction data to a record of charge, as set forth in *McRO, Inc. v. Bandai Namco Games America Inc.* (Fed. Cir. case number 15-1080, Sep. 13, 2016). In other words, the outcome of linking an enriched transaction data to a record of charge can be performed by many different types of rules and combinations of rules, and this disclosure includes various embodiments with specific rules. While the absence of complete preemption may not guarantee that a claim is eligible, the disclosure does not sufficiently preempt the field of linking an enriched transaction data to a record of charge at all. The disclosure acts to narrow, confine, and otherwise tie down the disclosure so as not to cover the general abstract idea of just linking an enriched transaction data to a record of charge. Significantly, other systems and methods exist for linking an enriched transaction data to a record of charge, so it would be inappropriate to assert that the claimed invention preempts the field or monopolizes the basic tools of linking an enriched transaction data to a record of charge. In other words, the disclosure will not prevent others from linking an enriched transaction data to a record of charge, because other systems are already performing the functionality in different ways than the claimed invention. Moreover, the claimed invention includes an inventive concept that may be found in the non-conventional and non-generic arrangement of known, conventional pieces, in conformance with Bascom v. *AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the systems and methods may include alerting a subscriber when their computer is offline. With brief reference to FIG. 1, system 100 may include generating customized information, via issuer system 110, and alerting a remote subscriber that the information can be accessed from their computer. The alerts are generated by filtering received information, building information alerts and formatting the alerts into data blocks based upon subscriber preference information. The data blocks are transmitted to the subscriber's wireless device (e.g., user terminal 160), which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface (e.g., via user terminal 160) for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer (e.g., issuer system 110) from being compromised, for example by being infected with a computer virus. The system may scan, via issuer system 110 for example, electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, system 100 may also address the problem of retaining control over customers during affiliate purchase transactions, using a system for co-marketing the "look and feel" of the host web page with the product-related content information of the advertising merchant's web page. System 100 can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link, via user terminal 160, for example, is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

As used herein, "satisfy," "meet," "match," "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

A record of charge (or "ROC") may comprise any transaction or transaction data. The ROC may be a unique identifier associated with a transaction. A transaction may, in various embodiments, be performed by a one or more members using a transaction account, such as a transaction account associated with a gift card, a debit card, a credit card, and the like. A ROC may, in addition, contain details such as location, merchant name or identifier, transaction amount, transaction date, account number, account security pin or code, account expiration date, and the like for the transaction.

Terms and phrases similar to "match" and/or "associate" may include tagging, flagging, correlating, using a look-up table or any other method or system for indicating or creating a relationship between elements such as, for example, (i) a transaction account and (ii) an item (e.g. offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

The customer may be identified as a customer of interest to a merchant based on the customer's transaction history at the merchant, types of transactions, type of transaction account, frequency of transactions, number of transactions, lack of transactions, timing of transactions, transaction history at other merchants, demographic information, personal information (e.g., gender, race, religion), social media or any other online information, potential for transacting with the merchant and/or any other factors.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge ("ROC"), from summaries of charges ("SOC"), from internal data, or from other suitable sources. Big data sets may be compiled without descriptive metadata such as column types, counts, percentiles, or other interpretive-aid data points.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE®.pdf document, etc.), an "ebook," an "emagazine," an application or microapplication (as described herein), an SMS or other type of text message, an email, Facebook® message, Twitter® tweet and/or message, MMS, and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the herein particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system may also include a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS, EDB® Postgres Plus Advanced Server® (PPAS), etc.). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS, IMACS, and MACBOOKS®, kiosks, terminals, point of sale ("POS") devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

As those skilled in the art will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security ("TLS"). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and communicates a detected input from the hardware to the micro-app.

Any databases discussed herein may include relational, hierarchical, graphical, blockchain, or object-oriented structure and/or any other database configurations. The databases may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), MongoDB®, Redis®, Apache Cassandra®, or any other suitable database product. Moreover, the databases may be organized in any suitable manner, for example, as data tables or lookup tables. Each record may be a single file, a series of files, a linked series of data fields or any other data structure.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may then be designated as a key field in a plurality of related data tables and the data tables may be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using fixed storage allocation, circular queue techniques, or best practices with respect to memory management (e.g., paged memory, least recently used, etc.). By using BLOB methods, the ability to store various data sets that have different formats facilitates the storage of data, in the database or associated with system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device, or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server ("MTS"), and MICROSOFT® SQL Server, are used in conjunction with the MICROSOFT® operating system, MICROSOFT® web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object ("ADO") compliant database management system. In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages ("ASP"), common gateway interface scripts ("CGI"), extensible markup language ("XML"), dynamic HTML, cascading style sheets ("CSS"), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art.

Middleware may be implemented through commercially available hardware and/or software, through custom hardware and/or software components, or through a combination thereof. Middleware may reside in a variety of configurations and may exist as a standalone system or may be a software component residing on the Internet server.

Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Those skilled in the art will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT, JAVASCRIPT Object Notation ("JSON"), VBScript, Macromedia Cold Fusion, COBOL, MICROSOFT® Active Server Pages, assembly, PERL, PHP, awk, Python, Ruby, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as, for example, ReachJS®; and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WIN- DOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is intended to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Therefore, the following is claimed:

1. A system, comprising:
   a device comprising a processor, a memory, and a display; and
   machine-readable instructions stored in the memory that, when executed by the processor, cause the device to at least:
      perform optical character recognition (OCR) on an image of a receipt to generate a first plurality of strings;
      retrieve a list of transactions, each transaction including a second plurality of strings;
      match a first string in the first plurality of strings to a second string in the second plurality of strings;
      calculate a percentage of likelihood that the image of the receipt is associated with a transaction in the list of transactions based at least in part on a match between the first string and the second string, wherein the transaction in the list of transactions is associated with the second string;
      determine that the percentage of likelihood meets or exceeds a predefined threshold;
      in response to a determination that the percentage of likelihood meets or exceeds a predefined threshold, render the transaction in the list of transactions on the display;
      receive a user input that the transaction in the list of transactions is associated with the receipt; and
      cause the receipt to be stored in association with the transaction in response to receipt of the user input.

2. The system of claim 1, wherein the machine-readable instructions, when executed by the processor, further cause the device to at least convert the image of the receipt to black-and-white prior to performance OCR on the image of the receipt.

3. The system of claim 1, wherein the machine-readable instructions, when executed by the processor, further cause the device to at least crop the image of the receipt prior to performance OCR on the image of the receipt.

4. The system of claim 1, wherein the machine-readable instructions, when executed by the processor, further cause the device to obtain a user selection of the image of the receipt from a plurality of images stored in the memory of the device.

5. The system of claim 1, wherein the device further comprises a camera and the machine-readable instructions, when executed by the processor, further cause the device to capture the image of the receipt with the camera.

6. The system of claim 1, wherein the transaction is one of a plurality of transactions rendered on the display which have a percentage of likelihood that meets or exceeds the threshold.

7. The system of claim 1, wherein the first string and the second string represent a transaction date, a transaction amount, a merchant identifier (ID), a merchant name, an authorization code, or an authorization time stamp.

8. A method, comprising:
   performing optical character recognition (OCR) on an image of a receipt to generate a first plurality of strings;
   retrieving a list of transactions, each transaction including a second plurality of strings;
   matching a first string in the first plurality of strings to a second string in the second plurality of strings;
   calculating a percentage of likelihood that the image of the receipt is associated with a transaction in the list of transactions based at least in part on a match between the first string and the second string, wherein the transaction in the list of transactions is associated with the second string;
   determining that the percentage of likelihood meets or exceeds a predefined threshold;
   in response to determining that the percentage of likelihood meets or exceeds a predefined threshold, rendering the transaction in the list of transactions on the display;
   receiving a user input that the transaction in the list of transactions is associated with the receipt; and
   causing the receipt to be stored in association with the transaction in response to receipt of the user input.

9. The method of claim 8, further comprising converting the image of the receipt to black-and-white prior to performance OCR on the image of the receipt.

10. The method of claim 8, further comprising cropping the image of the receipt prior to performance OCR on the image of the receipt.

11. The method of claim 8, further comprising obtaining a user selection of the image of the receipt from a plurality of images.

12. The method of claim 8, further comprising capturing the image of the receipt with a camera.

13. The method of claim 8, wherein the transaction is one of a plurality of transactions rendered on the display which have a percentage of likelihood that meets or exceeds the threshold.

14. The method of claim 8, wherein the first string and the second string represent a transaction date, a transaction amount, a merchant identifier (ID), a merchant name, an authorization code, or an authorization time stamp.

15. A non-transitory, computer-readable medium comprising machine-readable instructions that, when executed by a processor of a device that comprises a display, cause the device to at least:
   perform optical character recognition (OCR) on an image of a receipt to generate a first plurality of strings;
   retrieve a list of transactions, each transaction including a second plurality of strings;
   match a first string in the first plurality of strings to a second string in the second plurality of strings;
   calculate a percentage of likelihood that the image of the receipt is associated with a transaction in the list of transactions based at least in part on a match between the first string and the second string, wherein the transaction in the list of transactions is associated with the second string;
   determine that the percentage of likelihood meets or exceeds a predefined threshold;
   in response to a determination that the percentage of likelihood meets or exceeds a predefined threshold, render the transaction in the list of transactions on the display;
   receive a user input that the transaction in the list of transactions is associated with the receipt; and
   cause the receipt to be stored in association with the transaction in response to receipt of the user input.

16. The non-transitory, computer-readable medium of claim 15, wherein the machine-readable instructions, when executed by the processor, further cause the device to at least convert the image of the receipt to black-and-white prior to performance OCR on the image of the receipt.

17. The non-transitory, computer-readable medium of claim 15, wherein the machine-readable instructions, when executed by the processor, further cause the device to at least crop the image of the receipt prior to performance OCR on the image of the receipt.

18. The non-transitory, computer-readable medium of claim 15, wherein the machine-readable instructions, when executed by the processor, further cause the device to obtain a user selection of the image of the receipt from a plurality of images stored in a memory of the device.

19. The non-transitory, computer-readable medium of claim 15, wherein the device further comprises a camera and the machine-readable instructions, when executed by the processor, further cause the device to capture the image of the receipt with the camera.

20. The non-transitory, computer-readable medium of claim 15, wherein the transaction is one of a plurality of transactions rendered on the display which have a percentage of likelihood that meets or exceeds the threshold.

* * * * *